(12) United States Patent
Hiraya et al.

(10) Patent No.: US 6,814,046 B1
(45) Date of Patent: Nov. 9, 2004

(54) DIRECT FUEL INJECTION ENGINE

(75) Inventors: Koji Hiraya, Yokohama (JP); Eiji Takahashi, Yokosuka (JP); Hirofumi Tsuchida, Yokosuka (JP); Isamu Hotta, Yokohama (JP); Akihiko Kakuho, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/788,324

(22) Filed: Mar. 1, 2004

(30) Foreign Application Priority Data

Apr. 25, 2003 (JP) ........................................ 2003-121610
May 30, 2003 (JP) ........................................ 2003-154056

(51) Int. Cl.[7] ................................................. F02B 3/00
(52) U.S. Cl. ........................ 123/294; 123/304; 123/305; 123/276
(58) Field of Search ................................. 123/294, 295, 123/298, 304, 305, 276, 279, 661

(56) References Cited

U.S. PATENT DOCUMENTS

| | | | | |
|---|---|---|---|---|
| 4,106,448 A | * | 8/1978 | Noguchi et al. | 123/268 |
| 5,549,087 A | * | 8/1996 | Gray et al. | 123/254 |
| 6,058,906 A | * | 5/2000 | Yoshino | 123/295 |
| 6,739,309 B2 | * | 5/2004 | Hiraya et al. | 123/279 |

FOREIGN PATENT DOCUMENTS

| | | |
|---|---|---|
| JP | 08-177684 A | 7/1996 |
| JP | 11-082028 A | 3/1999 |
| JP | 2000-303936 A | 10/2000 |

* cited by examiner

Primary Examiner—John T. Kwon
(74) Attorney, Agent, or Firm—Shinjyu Global IP Counselors, LLP.

(57) ABSTRACT

A direct fuel injection engine basically comprises a combustion chamber, a piston with a cavity, a fuel injection valve, a spark plug and a control unit. The fuel injection valve is configured and arranged to directly inject a fuel stream into the combustion chamber in a substantially constant hollow circular cone shape in a stratified combustion region. The control unit is configured to ignite a first air-fuel mixture formed directly after the fuel stream is injected and prior to a majority of the fuel stream striking the cavity when the direct fuel injection engine is operating in a low-load stratified combustion region, and to ignite a second air-fuel mixture formed after a majority of the fuel stream is guided by the cavity toward an upper portion of the combustion chamber above the cavity when the direct fuel injection engine is operating in a high-load stratified combustion region.

23 Claims, 12 Drawing Sheets

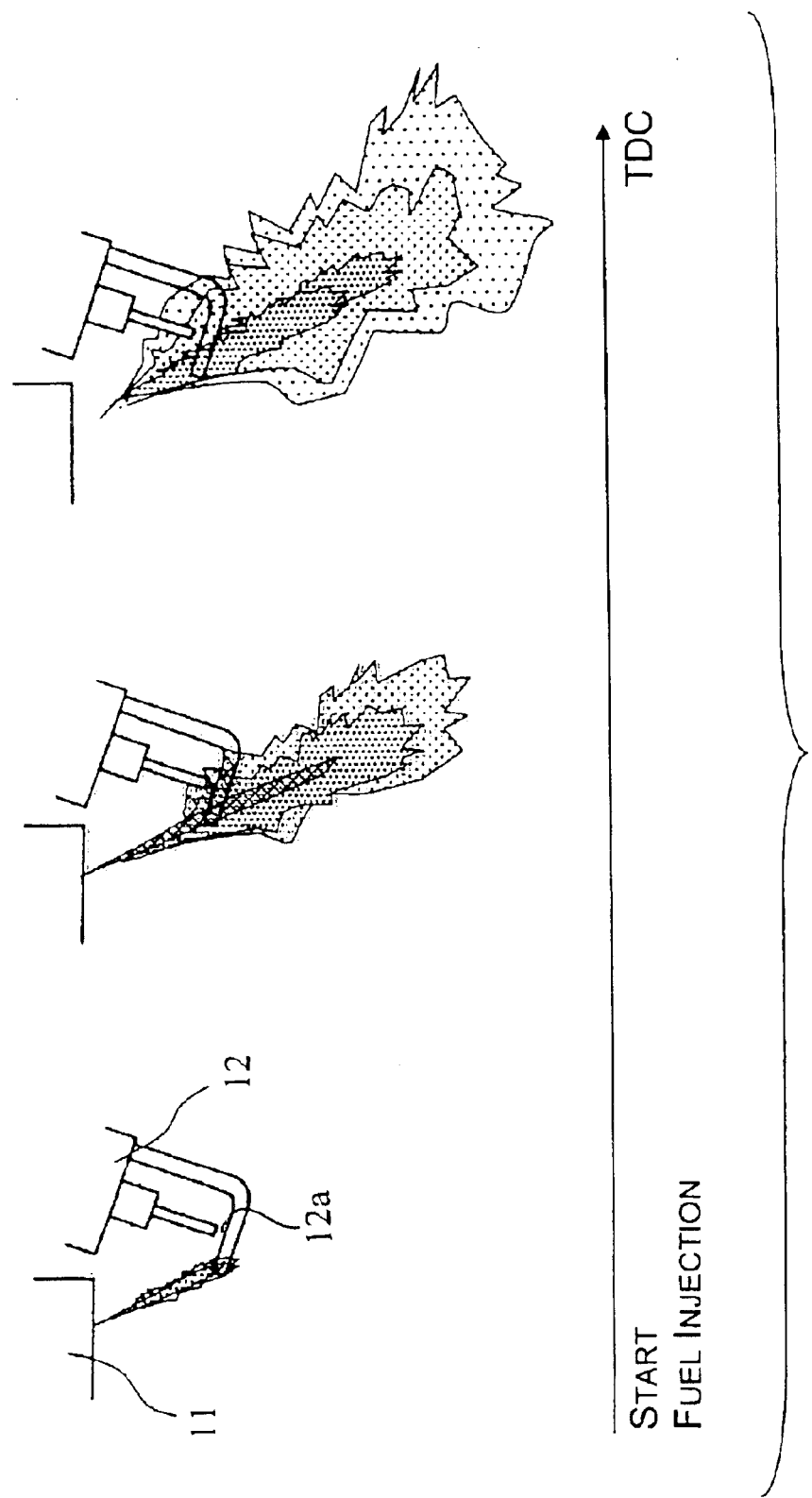

DIRECT FUEL INJECTION ENGINE

BACKGROUND OF THE INVENTION

1. Field of the Invention

The present invention generally relates to a direct fuel injection engine in which a fuel is directly injected in a combustion chamber and ignited by a spark plug. More specifically, the present invention relates to a direct fuel injection engine that performs stratified combustion and homogeneous combustion by directly injecting a fuel in the combustion chamber.

2. Background Information

One example of a conventional direct fuel injection engine is disclosed in Japanese Laid-Open Patent Publication No. H11-82028. The direct fuel injection engine disclosed in this reference has a concave cavity or a piston bowl formed on the piston crown surface. In addition, this conventional direct fuel combustion engine forms a suitable stratified air-fuel mixture in the cylinder by arranging a fuel injection valve substantially directly above the piston bowl. This arrangement allows the fuel stream to collide against a peripheral side wall of the piston bowl and form a fuel stream circulation flow towards the center portion of the piston bowl to reduce fuel consumption.

In view of the above, it will be apparent to those skilled in the art from this disclosure that there exists a need for an improved direct fuel injection engine. This invention addresses this need in the art as well as other needs, which will become apparent to those skilled in the art from this disclosure.

SUMMARY OF THE INVENTION

In the conventional direct fuel injection engine described above, a volume of the stratified air-fuel mixture that is formed after colliding with the piston is determined substantially by the shape of the piston cavity or the capacity of the cavity. In other words, in the above mentioned conventional direct fuel injection engine, the volume of the stratified air-fuel mixture formed via the cavity is always constant regardless of the engine load since the capacity of the cavity is constant. Therefore, a range of engine load conditions that allows excellent stratified combustion operation is limited with the conventional direct fuel injection engine. More specifically, if the cavity size and other control parameter is determined to obtain stable combustion and to realize good fuel efficiency and small exhaust gas emissions during one stratified operating region with a certain engine load and a certain engine rotation speed, then good fuel efficiency may not be realized or the so-called recoil will occur in another stratified operating region with a different engine rotation speed and a different engine load.

For example, when the engine rotation speed is fast, the advance of the crank angle becomes faster compared to when the engine rotation speed is slow, and thus, the time allowed to form an air-fuel mixture becomes shorter. Therefore, if an identical fuel injection timing and an identical fuel injection duration (this is basically proportional to the engine load) are used for both when the rotation speed is fast and slow, then the ignition timing occurs before the combustible air-fuel mixture reaches the vicinity of the spark plug when the engine rotation speed is fast. In order to avoid this problem, it is possible to set the fuel injection timing to be more advanced as the engine rotation speed becomes. However, in such case, the fuel stream injected during an earlier part of the injection might not be received in the cavity of the piston. In particular, considering executing a homogeneous combustion in the full load region, in which the fuel is injected during an intake stroke, the fuel stream must be injected with at least equal to or more than a certain injection opening angle. Thus, the fuel injection timing in the stratified combustion state cannot be arranged to be too early.

Moreover, when the cavity is made with a larger opening in order to make it easier to accept the fuel stream, the depth of the cavity is restricted to be less than a certain depth in view of the compression ratio. Accordingly, it becomes difficult to receive the fuel stream due to an insufficient depth.

Thus, since an air-fuel mixture is always formed via the cavity and ignited during stratified combustion in a conventional direct fuel injection engine, it is difficult to obtain stable combustion and good fuel efficiency as well as small exhaust emission under various conditions in which the engine rotation speed fluctuates between fast and slow. Moreover, the engine load also changes from low-load to high-load or vice versa during the stratified combustion. When the engine load is low during the stratified combustion, the stratified air-fuel mixture in the vicinity of the spark plug tends to be lean in the above mentioned conventional direct fuel injection engine because the air-fuel mixture is formed after the fuel stream collides against the cavity. Thus, the combustion stability is worsened thereby causing the fuel efficiency to deteriorate. On the other hand, when the engine load is high during the stratified combustion, the air-fuel mixture in the vicinity of the spark plug tends to become excessively dense with the above mentioned conventional direct fuel injection engine. Thus, smoke and HC is increased.

Accordingly, one object of the present invention is to expand a range of engine operation conditions that allows excellent stratified combustion operation at a low cost by executing two different stratified combustion operations depending on the engine load and/or the engine rotation speed.

In order to achieve the above and other objects, a direct fuel injection engine of the present invention basically comprises a combustion chamber, a piston, a fuel injection valve, a spark plug and a control unit. The piston includes a top surface having a cavity at a substantially center portion of the top surface. The cavity is defined at least by a peripheral wall surface and a bottom surface. The fuel injection valve is positioned at an upper portion of the combustion chamber substantially on a center axis of the piston. The fuel injection valve is configured and arranged to directly inject a fuel stream inside the combustion chamber in a substantially constant hollow circular cone shape during a compression stroke when the direct fuel injection engine is operating in a stratified combustion region. The spark plug is configured and arranged to ignite the fuel. The control unit is configured and arranged to control operations of the fuel injection valve and the spark plug. The control unit is further configured and arranged to ignite a first air-fuel mixture formed directly after the fuel stream is injected from the fuel injection valve and prior to a majority of the fuel stream striking the cavity when the direct fuel injection engine is operating in a low-load stratified combustion region. The control unit is further configured and arranged to ignite a second air-fuel mixture formed after a majority of the fuel stream is guided toward an upper portion of the combustion chamber above the cavity by the bottom surface of the cavity after the fuel stream first hits the peripheral wall surface of the cavity when the direct fuel injection engine is operating in a high-load stratified combustion region.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3(b) is an enlarged, partial diagrammatic side view of a spark plug and a fuel stream illustrating distribution of the fuel stream in a time-series manner in the low-load stratified combustion region in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
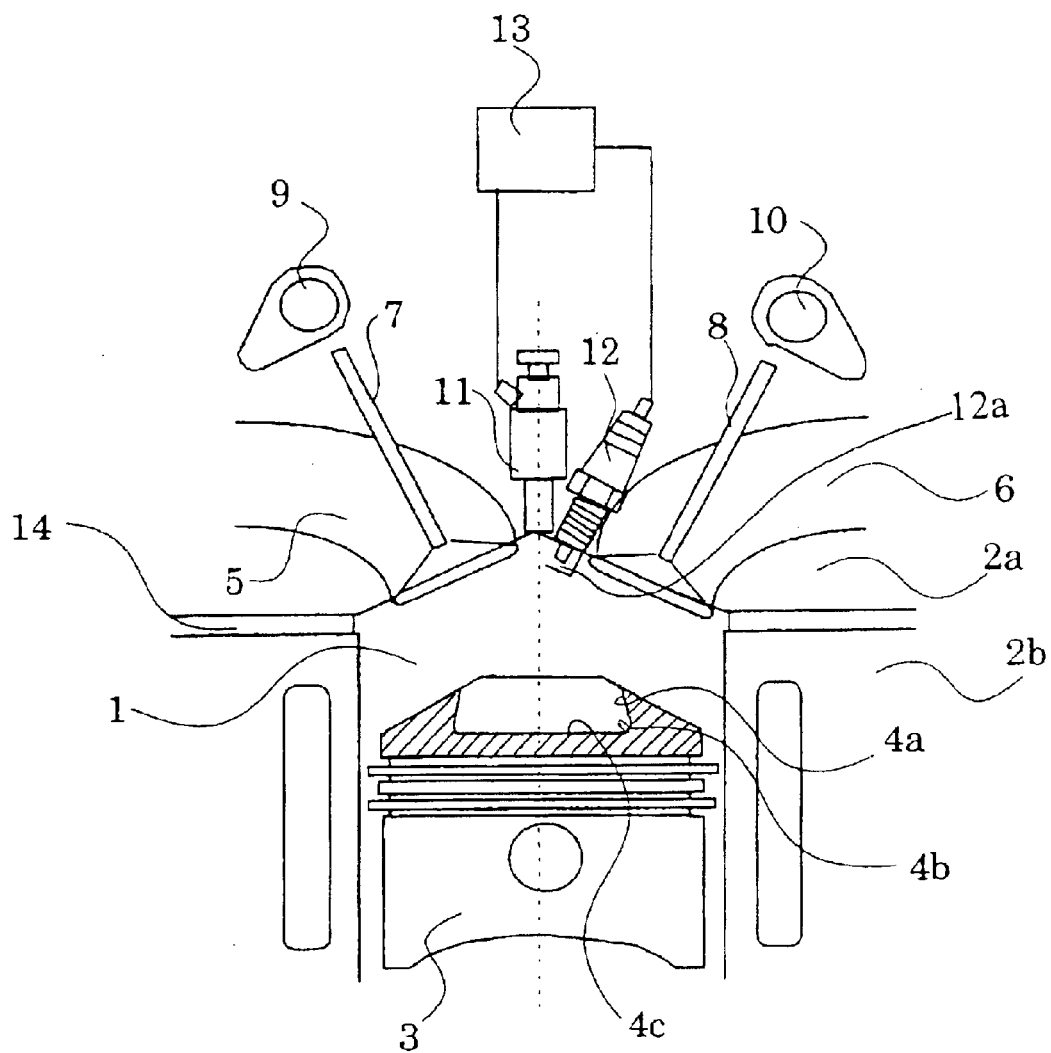
FIG. 1 is a partial cross sectional view of an injection portion of a combustion chamber of a direct fuel injection engine in accordance with a first embodiment of the present invention.

Referring initially to FIGS. 1–4, a direct fuel injection engine is illustrated in accordance with a first embodiment of the present invention. FIG. 1 is a partial cross sectional view of an injection portion of a combustion chamber 1 of a direct fuel injection engine of the first embodiment. The combustion chamber 1 is basically formed by a cylinder head 2a, a cylinder block 2b and a piston 3. A gasket 14 is placed between the cylinder head 2a and the cylinder block 3. A substantially cylindrical cavity 4 is provided at the center of a crown surface or a top surface of the piston 3. The cavity 4 is formed with a peripheral wall surface or an inner peripheral surface 4a and a flat bottom surface 4c that are smoothly joined by a curved surface 4b. As seen in FIG. 1, the inner peripheral surface 4a is preferably inclined or slanted towards a center axis of the piston 3 to form a reentrant shape of the cavity 4. The cavity flat bottom surface 4c is preferably a smooth surface without any unevenness and disposed substantially perpendicular to the center axis of the piston 3. Therefore, the cavity 4 forms a substantially cone shape with a portion including an apex of the cone being cut off. An intake port 5 is arranged to send air required for combustion to the combustion chamber 1 through an intake valve 7 that is operatively controlled by an intake valve cam 9. The intake valve 7 is preferably coupled to a variable valve timing mechanism that allows at least the intake valve closing timing to be varied (i.e., delayed and advanced). For example, a variable valve timing mechanism that changes the relative phase between the camshaft and the crankshaft can be coupled to the intake valve 7. Such variable valve timing mechanism is well known in the art, and thus, not discussed in detail herein. An exhaust port 6 discharges exhaust gases combusted in the combustion chamber 1 through an exhaust valve 8 that is operatively controlled by an exhaust valve cam 10.

A spark plug 12 is positioned substantially adjacent to the fuel injection valve 11 so that a spark gap 12a of the spark plug 12 is positioned in the vicinity of the center of the combustion chamber 1. The spark plug 12 is configured and arranged to ignite the fuel stream injected by the fuel injection valve 11 to cause combustion.

A fuel injection valve 11 is provided on the cylinder head 2a and preferably positioned substantially on the center axis of the piston 3, which is substantially coincident with a center axis of a cylinder, at the upper portion of the combustion chamber 1. The fuel injection valve 11 is preferably configured and arranged to have a plurality of through-holes or nozzles with identical shapes through which the fuel is injected into the combustion chamber 1. More specifically, a plurality of solid-core fuel streams is injected from these nozzles towards the piston 3. Thus, the plurality of solid-core fuel streams injected from the fuel injection valve 11 collectively forms a fuel stream with a substantially constant hollow cone shape. The "substantially constant hollow cone shape" as used herein basically refers to that an injection opening angle or an apex angle (umbrella angle) of the cone is substantially constant. In other words, the fuel injection valve 11 does not have a special variable mechanism for changing the injection opening angle. Rather, the present invention utilizes the fuel injection valve 11 whose injection opening angle is not greatly affected by the factors such as an amount of fuel injected or fuel injection timing (i.e., pressure inside the cylinder during fuel injection). Therefore, the fuel stream can be reliably injected toward a desired direction. More specifically, in the present invention, the fuel injection valve 11 is configured and arranged to inject the fuel stream toward the discharge gap 12a of the spark plug 12 or in the vicinity of the electrodes of the spark plug 12 when the engine is operating in the low-load stratified combustion state or region, and toward the cavity inner peripheral surface 4a when the engine is operating in the high-load stratified state or region.

An engine control unit 13 is operatively coupled to the spark plug 12 and the fuel injection valve 11 and configured and arranged to control various operations of the direct fuel injection engine, such as the fuel injection timing and duration of the fuel injection valve 11 and the fuel injection timing of the spark plug 12, based on the engine operational conditions. More specifically, the control unit 13 preferably includes a microcomputer with a control program that controls the direct fuel injection engine as discussed below. The control unit 13 can also include other conventional components such as an input interface circuit, an output interface circuit, and storage devices such as a ROM (Read Only Memory) device and a RAM (Random Access Memory) device. The microcomputer of the control unit 13 is programmed to control the direct fuel control engine. The memory circuit stores processing results and control programs that are run by the processor circuit. The control unit 13 is operatively coupled to the various components of the direct fuel injection engine including the fuel injection valve 11 and the spark plug 12 in a conventional manner. The internal RAM of the control unit 13 stores statuses of operational flags and various control data. The control unit 13 is capable of selectively controlling any of the components of the control system in accordance with the control program. It will be apparent to those skilled in the art from this disclosure that the precise structure and algorithms for control unit 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The direct fuel injection engine of the present invention is configured and arranged to perform combustion of the air-fuel mixture in a homogeneous combustion operating region or a stratified combustion operating region depending on an operating condition of the direct fuel injection engine. In the homogeneous combustion operating region, the fuel is injected during an intake stroke (preferably in the first half of the intake stroke) to form a homogeneous fuel air mixture throughout the combustion chamber 1 to perform combustion in a stoichiometric air-fuel ratio operation. In the stratified combustion operating region, a fuel is injected during a compression stroke (preferably in the second half of the compression stroke) to form a stratified fuel-air mixture inside and/or above the cavity 4 to achieve a lean operation to improve fuel economy. Moreover, in the first embodiment of the present invention, two different operations are performed in the stratified combustion operating region depending on the engine load. In a low-load stratified combustion region, the fuel injected from the fuel injection valve 11 is ignited directly after the fuel is injected before a majority of the fuel stream collides against the cavity 4. In a high-load stratified combustion region, the fuel stream is ignited after the fuel stream collides against the inner peripheral surface 4a of the cavity 4 and rises upwardly in the center portion of the cavity 4 as guided by the curved surface 4b and the cavity bottom surface 4c. Moreover, by utilizing the fuel injection valve 11 that injects a fuel stream with a substantially constant hollow cone shape, a comparatively small air-fuel mixture mass in a low-load stratified combustion region and a comparatively large air-fuel mixture mass in a high-load stratified combustion region are obtained at a low cost. Accordingly, with the arrangement of the direct fuel injection engine of the present invention, the stratified combustion operating region can be expanded at a low cost.

Figure 2:
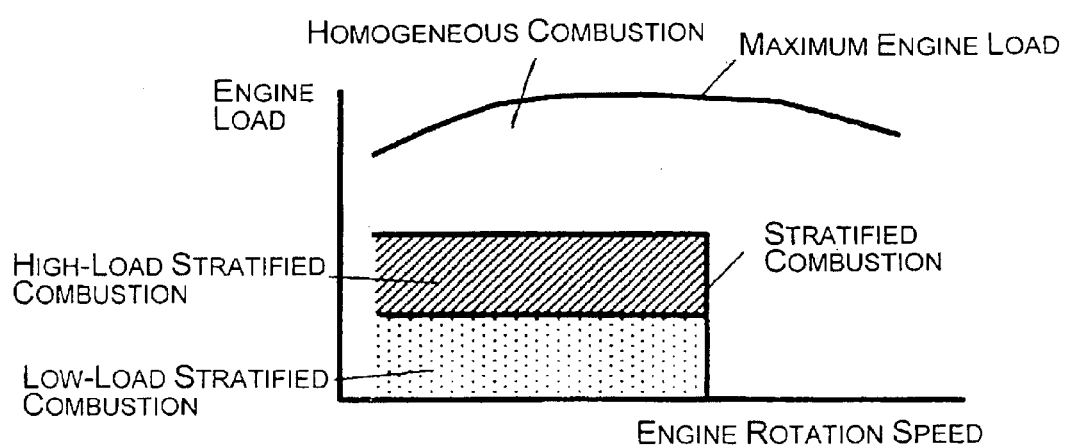
FIG. 2 is a diagrammatic chart illustrating the relationship between engine operation regions and an engine load and an engine rotation speed in accordance with the first embodiment of the present invention.

FIG. 2 is a diagrammatic chart illustrating the relationship between the homogeneous combustion operating region, the high-load stratified combustion region and the low-load stratified combustion region with respect to an engine load and an engine rotation speed in accordance with the first embodiment. Among all of the operating regions, the stratified combustion operating region (including the high-load and low-load stratified combustion regions) is set to a comparatively low load and slow rotational speed region. In the stratified combustion operating region, a stratified combustion is performed in which an air-fuel mixture is formed within a portion above the cavity 4 and/or inside the cavity 4. As seen in FIG. 2, the stratified combustion operating region is divided into the high-load stratified combustion region where the engine load is relatively high and the low-load stratified combustion region where the engine load is relatively low.

When the direct fuel injection engine is operating in the low-load stratified combustion region, the control unit 13 is configured and arranged to operate the spark plug 12 to ignite an air-fuel mixture that is formed directly after the fuel stream is injected from the fuel injection valve 11 and before the majority of the fuel stream collides against the cavity 4. When the direct fuel injection engine is operating in the high-load stratified combustion region, the control unit 13 is configured and arranged to operate the spark plug 12 to ignite an air-fuel mixture formed after a majority of the fuel stream is guided toward an upper portion of the combustion chamber 1 above the cavity 4 by the bottom surface 4c of the cavity 4 after the fuel stream first collides against the inner peripheral wall surface 4a of the cavity 4. In other words, an interval between when the fuel is injected and when the fuel is ignited is set relatively shorter in the low-load stratified combustion region and relatively longer in the high-load stratified combustion region.

As seen in FIG. 2, the homogeneous combustion operating region is set such that the engine load is higher and the engine rotation speed is faster in the homogeneous combustion operating region than in the stratified combustion operating region. In the homogeneous combustion operating region, a fuel is injected from the fuel injection valve 11 during an intake stroke. Air is introduced from the intake port 5 to the combustion chamber 1 to form a homogeneous air-fuel mixture throughout the entire combustion chamber 1 so that homogeneous combustion is performed.

Figure 3A:
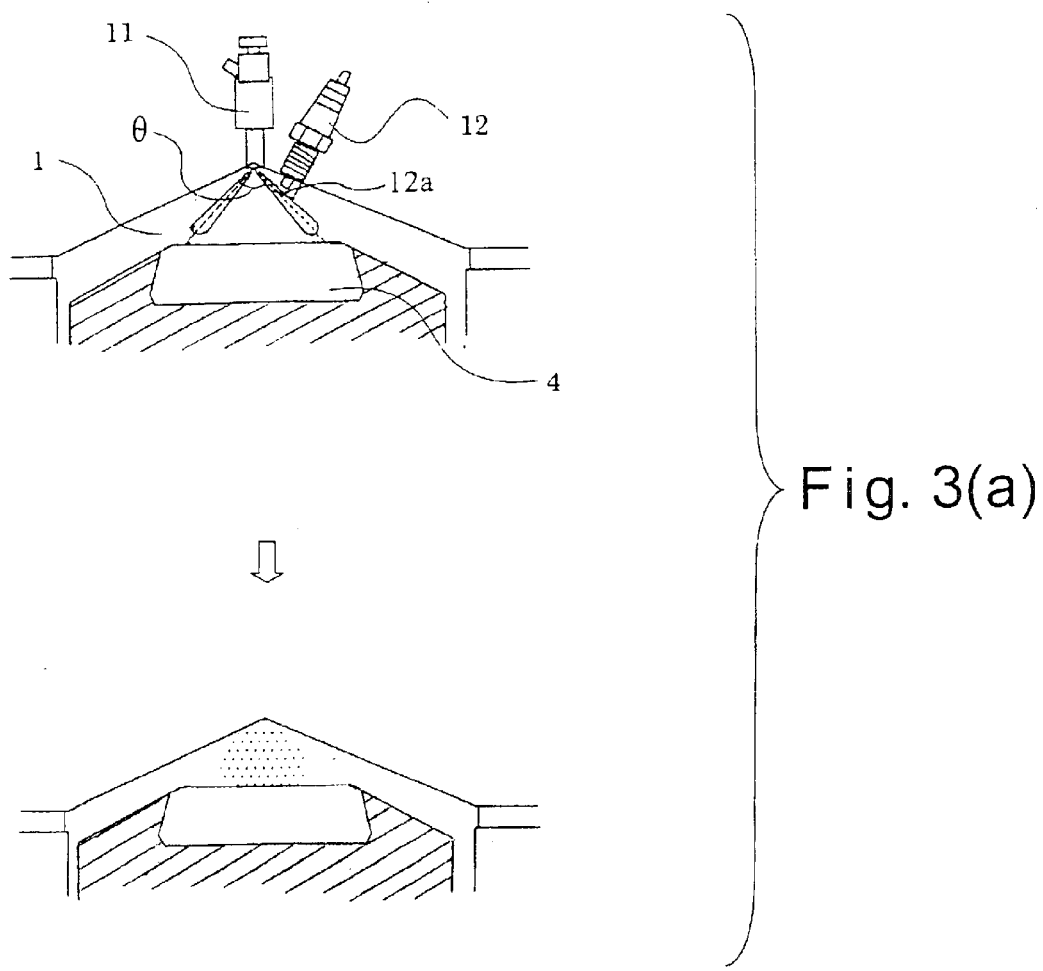
FIG. 3(a) is a diagrammatic cross sectional view of the combustion chamber shown in FIG. 1 illustrating distribution of the air-fuel mixture in the combustion chamber in a low-load stratified combustion region in accordance with the first embodiment of the present invention.

Referring now to FIGS. 3(a) and 3(b), distribution of the air-fuel mixture (first air-fuel mixture) in the combustion chamber 1 in the low-load stratified combustion region is described. In the low-load stratified combustion region, the fuel injection pressure is set to a comparatively low pressure. Thus, the penetration force of the fuel stream is reduced and a size of the air-fuel mixture mass is also reduced. Moreover, in the low-load stratified combustion region, the fuel injection timing is set to inject the fuel stream during the second half of the compression stroke close to the compression top dead center. Thus, a relatively small air-fuel mixture is ignited when the crank angle is close to the compression top dead center. Consequently, the fuel consumption efficiency is improved.

Since the amount of fuel injected in the low-load stratified combustion region is set to a small amount, the fuel injection is preferably completed before the tip of the hollow cone shape fuel stream reaches the piston 3. Thus, the air-fuel mixture is ignited by the spark plug 12 during the fuel injection or directly after the fuel injection is completed before the tip of the fuel stream reaches the cavity 4. More specifically, the fuel ignition timing is preferably set such that the air-fuel mixture is ignited when the fuel stream is still floating in the air before the tip of the hollow cone shape fuel stream reaches the piston 3. Accordingly, as seen in FIG. 3(a), a size of the air-fuel mixture mass at the time of ignition is relatively small in the low-load stratified combustion region.

The injection opening angle θ of the fuel injection valve 11 is preferably set to a relatively wide angle, for example, from approximately 60° to approximately 80°. Thus, the fuel stream injected from the fuel injection valve 11 preferably passes through the discharge gap 12a of the spark plug 12 or a through an area that is close to the electrodes of the spark plug 12. This arrangement of the relatively wide injection opening angle θ of the fuel injection valve 11 is advantageous because the fuel stream can be ignited by the spark plug 12 directly after the fuel injection ends as explained above. If the injection opening angle θ of the fuel injection valve 11 is relatively narrow, the discharge gap 12a of the spark plug 12 must protrude deeper into the combustion chamber 1 in order to ignite the fuel stream directly after injected, which makes it difficult to ensure the durability of the spark plug 12.

As seen in FIG. 3(b), the injected fuel stream is mixed with the surrounding air from the tip or periphery of the fuel stream. By setting the fuel injection timing close to the compression top dead center, the temperature inside the cylinder during fuel injection is high. Thus, the fuel is quickly vaporized and mixed with the air after injected. Accordingly, in the low-load stratified combustion region, the air-fuel mixture formed in the periphery of the fuel stream is ignited during the fuel injection or directly after the fuel injection is completed as the fuel stream is quickly vaporized and mixed with the air. Consequently, stable combustion is performed in the low-load stratified combustion region even when the engine rotation speed is fast and sufficient time cannot be provided to form an air-fuel mixture after the fuel stream collides against the cavity 4.

Moreover, when the engine load is low and the amount of fuel injected is small, the density of the air-fuel mixture formed by colliding the fuel stream against the piston 3 and defusing the fuel stream inside the cavity 4 generally tends to be excessively thin. Thus, since the fuel is directed ignited after injected with the direct fuel injection engine of the present invention, stable combustion is performed in the low-load stratified combustion region even when the engine load is low and the amount of fuel injected is relatively small. In addition, because the fuel is ignited before the tip of the fuel stream makes contact with the crown surface of the piston 3, the fuel is combusted without adhering to the piston 3. Thus, the amount of unburned HC produced is reduced. Moreover, the air-fuel mixture is combusted in a state in which the thermal insulation layer (air layer) is positioned between the air-fuel mixture and the piston 3, and thus, cooling loss is reduced.

Figure 4:
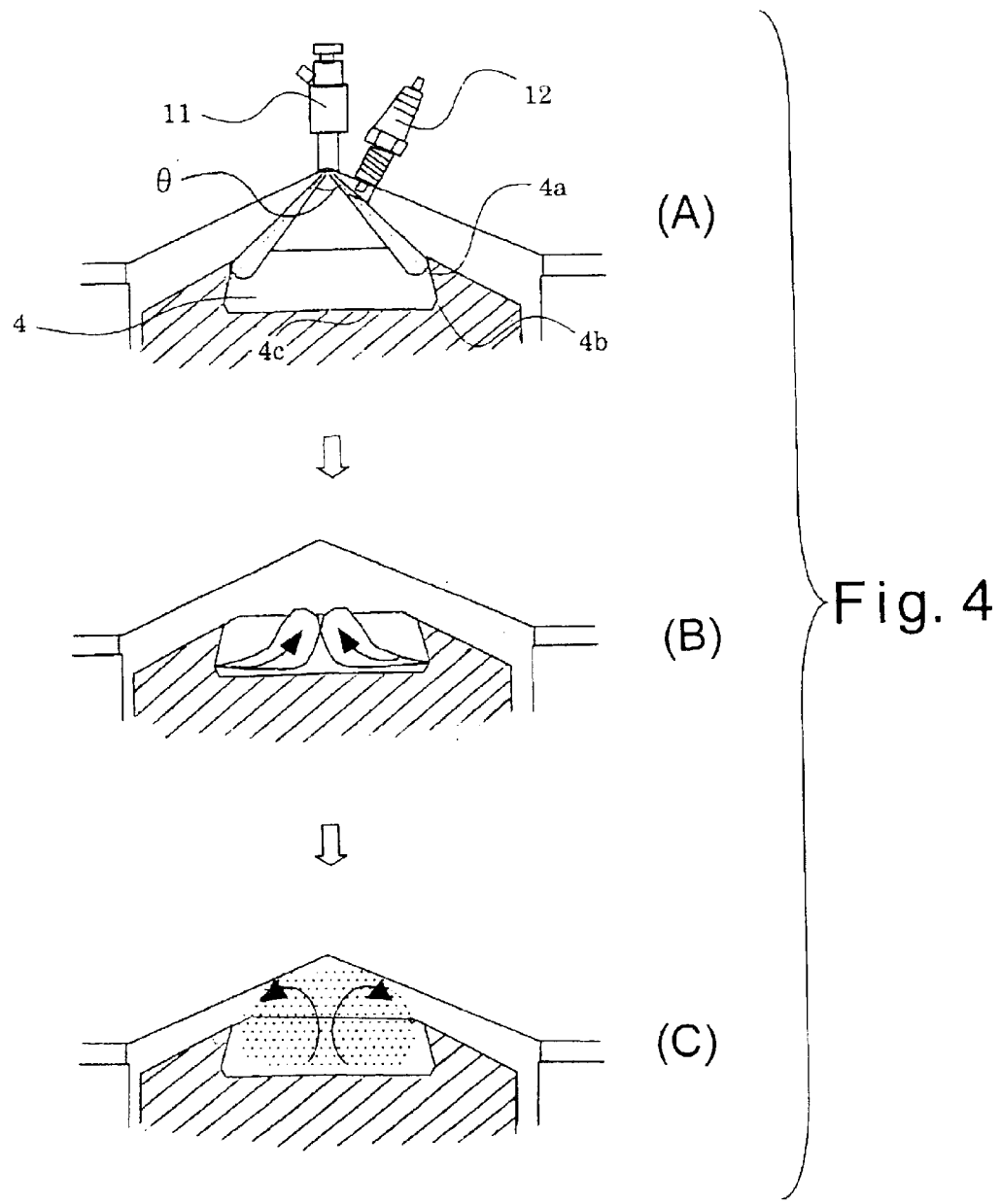
FIG. 4 is a diagrammatic cross sectional view of the combustion chamber shown in FIG. 1 illustrating distribution of the air-fuel mixture in the combustion chamber in a high-load stratified combustion region in accordance with the first embodiment of the present invention.

Next, referring to FIG. 4, distribution of the air-fuel mixture (second air-fuel mixture) in the combustion chamber 1 in the high-load stratified combustion region is described. In the high-load stratified combustion region, the fuel injection pressure is set to a comparatively high pressure. Thus, the penetration force of the fuel stream is increased thereby making it possible to produce a strong circulation flow of the fuel stream. Moreover, it is further preferable to set the fuel injection pressure higher as the engine load grows larger while the engine is operating in the high-load stratified combustion region. Furthermore, the fuel injection timing in the high-load stratified combustion region is set to the second half of the compression stroke that is more advanced than the fuel injection timing in the low-load stratified combustion region. Consequently, a sufficient time is ensured to mix the fuel and air by utilizing a circulation flow.

Since the fuel injection valve 11 is configured to inject a fuel stream to form a substantially constant hollow cone shape, the shape of the fuel stream in the high-load stratified combustion region is substantially identical to the shape of the fuel stream in the low-load stratified combustion region (i.e., the injection opening angle θ is from approximately 60° to approximately 80°). Thus, the fuel stream injected from the fuel injection valve 11 reaches the piston 3 and collides against the inner peripheral surface 4a of the cavity 4 as seen in diagram (A) of FIG. 4. Since the cavity inner peripheral surface 4a is preferably inclined inwardly such that the cavity 4 forms an substantially cone shape, the collision angle between the cavity inner peripheral surface 4a and the fuel stream is relatively small (e.g., an acute angle). Thus, majority of the fuel stream is guided downwardly toward the cavity 4 and remained within or above the cavity 4. Of course, it will be apparent to those skilled in the art from this disclosure to modify the cavity inner peripheral surface 4a to extend substantially parallel to the center axis of the piston 3 or slightly inclined radially outwardly in order to make the fabrication of the cavity 4 easier, although the amount of fuel overflowing from the cavity 4 will increase slightly in such cases.

After the collision, the fuel stream is guided downwardly in the cavity 4 along the cavity inner peripheral surface 4a. The travel direction of the fuel stream is then curved inwardly by the cavity curved surface 4b. Then, the fuel travels towards radial inner direction of the cavity 4 along the cavity bottom surface 4c. Since the cavity bottom surface 4c is preferably formed without any unevenness on its surface, the fuel stream traveling from the radial peripheral direction to the center of the cavity bottom surface 4c collide against each other in the vicinity of the center of the cavity bottom surface 4c. Thus, a flow that rises upwardly is effectively formed in the cavity 4 as seen in diagram (B) of FIG. 4. This flow of the fuel stream results in the fuel stream encompassing the circumference air as the fuel streams travels. Thus, a circulation flow of air-fuel mixture within the space between the cylinder head 2a and the piston 3 is formed as seen in diagram (C) of FIG. 4. This circulation flow promotes mixing of fuel and air and creates a substantially homogeneous air-fuel mixture mass within the cavity 4 and thereabove. In other words, when the fuel streams collide in the vicinity of the center of the bottom surface 4c, a moderate disturbance occurs resulting in favorable mixing of the fuel and air and form a substantially homogeneous air-fuel mixture within the cavity 4 and thereabove. Then, the spark plug 12 is configured and arranged to ignite this substantially homogeneous air-fuel mixture mass. Accordingly, in the high-load stratified combustion region, the size of the air-fuel mixture mass at the time of fuel ignition is relatively large.

The arrangement of the relatively wide injection opening angle θ of the fuel injection valve 11 is advantageous in the high-load stratified combustion region as well as in the low-load stratified combustion region. If a fuel injection valve 11 with a narrow injection opening angle is used, the fuel stream collides with the cavity bottom surface 4c resulting in a circulation flow that rotates in a direction opposite to the circulation flow described above. In such case, an air-fuel mixture mass created within the cavity 4 and thereabove tends to have a less dense air-fuel ratio at the center of this air-fuel mixture mass that is close to the spark plug 12. On the other hand, since the injection opening angle θ of the fuel injection valve 11 is relatively wide in the present invention, the air-fuel mixture mass can be obtained in which the air-fuel ratio is substantially uniform throughout the mass or the air-fuel ratio is slightly more dense at the center of the mass and becomes less dense as moving towards the periphery of the mass. Accordingly, with the direct fuel injection engine of the present invention, an effective ignition and stable combustion are obtained. Consequently, EGR can be introduced in large quantities making it possible to operate the engine with a small amount of NOx occurring. In the high-load stratified combustion region, the fuel may adhere to the cavity 4 of the piston 3 when the fuel stream collides against the cavity 4. However, the circulation flow of air-fuel mixture within the cavity 4 promotes the vaporization of the adhering fuel. Thus, any sudden increase in the amount of unburned HC produced is prevented in the high-load stratified combustion region.

Next, the fuel injection and the distribution of the air-fuel mixture during the homogeneous combustion region will be described. During the homogeneous combustion region, the fuel is injected from the fuel injection valve 11 in the second half of the intake stroke. As in the stratified combustion region, the fuel injection valve 11 is configured and arranged to inject a fuel stream with the relatively wide injection opening angle θ. Thus, the fuel stream is diffused throughout the combustion chamber 1 including areas outside of the cavity 4 and thoroughly mixed with the air to create an air-fuel mixture having a substantially stoichiometric air-fuel ratio in the combustion chamber 1. Accordingly, the combustion with good fuel efficiency and a small amount of exhaust gas emissions is achieved.

Accordingly, by changing the operations in the stratified combustion region depending on the engine load and by utilizing the fuel injection valve 11 that injects a fuel stream with a substantially constant hollow cone shape, the direct fuel injection engine of the present invention enables to obtain an excellent combustion in a wide range of engine operating conditions.

SECOND EMBODIMENT

Referring now to FIGS. 5–8, a direct fuel injection engine in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the direct fuel injection engine of the second embodiment is identical to the direct fuel injection engine of the first embodiment, except that operation of the direct fuel injection engine is in either the low-load or high-load stratified combustion regions is determined based on the engine rotation speed as well as the engine load. Moreover, in the second embodiment of the present invention, the operations of the intake valve opening timing and the fuel injection timing as well as the operations of the fuel injection pressure and the fuel injection timing are changed depending on whether the direct fuel injection engine is operating in the low-load or high-load stratified combustion regions.

When the engine rotation speed increases in the high-load stratified combustion region, there is a concern that there is no sufficient time to form a homogeneous air-fuel mixture. Moreover, there is also a danger of the flow inside the cylinder becoming so strong that the air-fuel mixture is excessively diffused and the air-fuel ratio in the vicinity of the spark plug 12 becomes excessively thin. On the other hand, if an excessive amount of fuel is injected during the low-load stratified combustion and the fuel is ignited while the fuel is being vaporized and mixed with the air, then an excessively dense air-fuel mixture may exist during flame propagation. In such case, the fuel combustion efficiency is reduced and exhaust gas emissions is increased.

Thus, in the second embodiment of the present invention, the operation in the low-load stratified combustion is executed when the engine rotation speed is relatively fast so that an air-fuel mixture with an air-fuel ratio suitable for ignition is always formed near the spark plug 12 regardless of the engine rotation speed. Generally, the gas flow inside the cylinder becomes larger as the engine rotation speed becomes faster. When the engine rotation speed is fast, the fuel stream is diffused and mixed with the air relatively fast due to the relatively large gas flow inside the cylinder. Thus, mixing of fuel is promoted in the flame propagation process in the low-load stratified combustion region after the fuel stream is injected due to the flow inside the cylinder when the engine rotation speed is relatively fast. Thus, the formation of an excessively dense air-fuel mixture is prevented in the low-load stratified combustion region. When, however, the engine rotation speed is relatively slow and the engine load is in relatively high, it is preferable to provide sufficient time for the fuel stream to be vaporized and mixed with the air.

Figure 5:
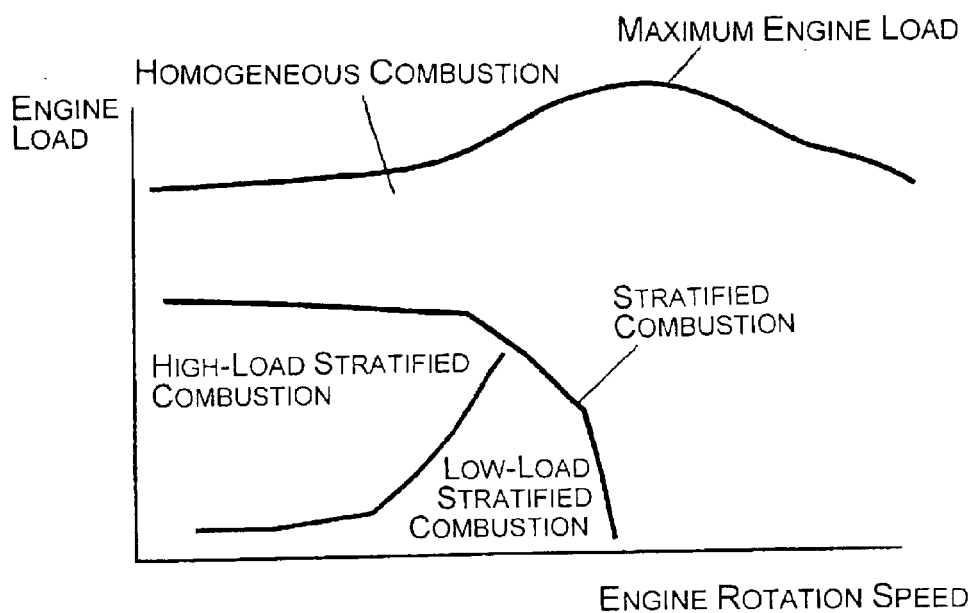
FIG. 5 is a diagrammatic chart illustrating the relationship between engine operation regions and an engine load and an engine rotation speed in accordance with a second embodiment of the present invention.

Accordingly, in the second embodiment of the present invention, the control unit 13 is configured to consider an engine rotation speed as well as an engine load in determining the operational regions of the direct fuel injection engine as seen in FIG. 5. More specifically, the control unit 13 is configured and arranged to determine the direct fuel injection engine is operating in the high-load stratified combustion region when the engine rotation speed is slower than a first prescribed engine rotation speed and the engine load is higher than a first prescribed engine load. The control unit 13 is configured to determine the direct fuel injection engine is operating in the low-load stratified combustion region when the engine rotation speed is faster than the first prescribed engine rotation speed and the engine load is lower than the first prescribed engine load. As seen in FIG. 5, the first prescribed engine load and the first prescribed engine rotation speed are preferably set such that the higher the first prescribed engine load becomes, the faster the first prescribed engine rotation speed becomes. In the second embodiment of the present invention, the homogeneous combustion is also performed in which the fuel is injected during a intake stroke in the homogeneous combustion region in which the engine load is equal to or more than a predetermined engine load and the engine rotation speed is equal to or more than a predetermined engine rotation speed as shown in FIG. 5.

Figure 6:
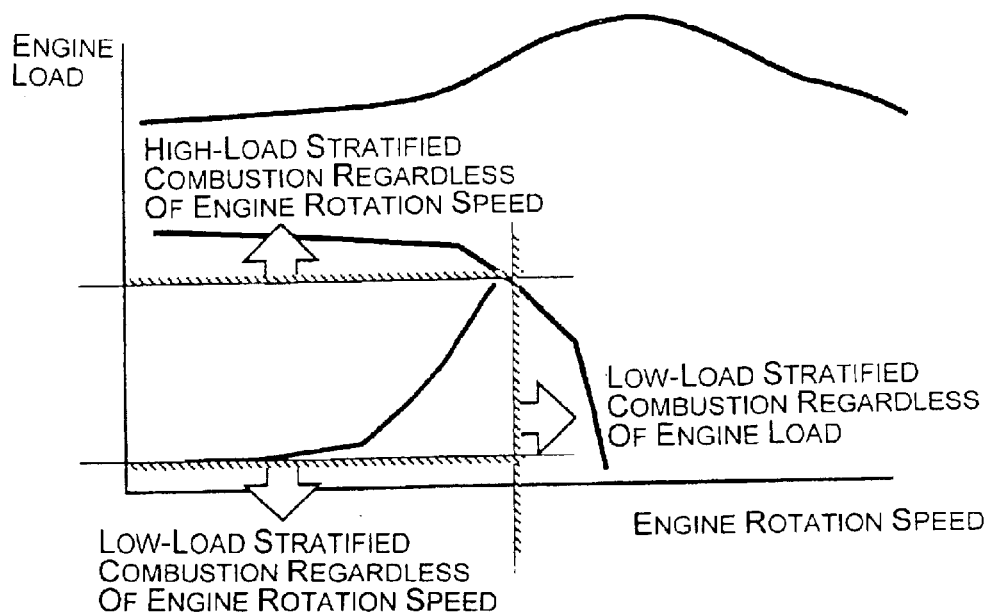
FIG. 6 is a diagrammatic chart illustrating the relationship between engine operation regions and an engine load and an engine rotation speed in accordance with the second embodiment of the present invention.

Also, as seen in FIG. 6, under certain engine operation conditions, the control unit 13 is configured to determine the direct fuel injection engine is operating in the high-load or low-load stratified combustion engine regardless of the engine rotation speed. Specifically, when the engine load increases more than a certain load (a second prescribed engine load), sufficient mixing of the fuel and air becomes difficult even though the flow is intensified by increasing the engine rotation speed if the fuel is ignited during fuel injection or directly after completion of the fuel injection but before the fuel stream collides against the piston 3 (i.e., the operation in the low-load stratified combustion region). In other words, if the control unit 13 determines the direct fuel injection engine is operating in the low-load stratified combustion engine when the engine load is equal to or higher than the second prescribed engine load, a risk increases that an excessively dense air-fuel mixture will be partially formed. Therefore, as shown in FIG. 6, the control unit 13 is configured to determine the direct fuel injection engine is operating in the high-load stratified operating region when the engine load is equal to or more than the second prescribed engine load regardless of the engine rotation speed. Thus, when the engine load is equal to or more than the second prescribed engine load, the fuel stream is ignited after colliding against the cavity 4 and forming an air-fuel mixture inside and above the cavity 4.

Moreover, when the engine load is equal to or less than a certain load (a third prescribed engine load), the amount of the fuel injected from the fuel injection valve 11 becomes small. Therefore, there is a risk of the density of the air-fuel mixture becoming excessively thin if the fuel is ignited after colliding against the cavity 4 and forming the air-fuel mixture as the operation in the high-load stratified combustion region. Accordingly, the control unit 13 is configured to determine the direct fuel injection engine is operating in the low-load stratified combustion region when the engine load is equal to or lower than the third prescribed engine load regardless of the engine rotation speed, as seen in FIG. 6. Thus, when the engine load is equal to or lower than the third prescribed engine load, the fuel stream is ignited during fuel injection or directly after completion of the fuel injection but before the fuel stream collides against the piston 3.

Furthermore, the control unit 13 is configured to determine the direct fuel injection engine is operating in the low-load stratified combustion region regardless of the engine load under certain engine operation conditions. When the engine rotation speed becomes faster than a certain rotation speed (second engine rotation speed), there is a risk that sufficient time is not provided to form an air-fuel mixture by hitting the fuel stream against the cavity 4. Moreover, in such case, if the fuel injection timing is set to reliability receive the fuel stream in the cavity 4, there is a risk that the air-fuel mixture has not reached near the spark plug 12 when the fuel ignition timing occurs. Therefore, the control unit 13 is configured to determine the direct fuel injection engine is operating in the low-load stratified combustion region when the engine rotation speed is faster than the second prescribed engine rotation speed regardless of the engine load, as shown in FIG. 6. Thus, when the engine rotation speed is faster than the second prescribed engine rotation speed, the fuel stream is ignited during fuel injection or directly after the fuel injection completes before the fuel stream collides against the piston 3.

Figure 7A:
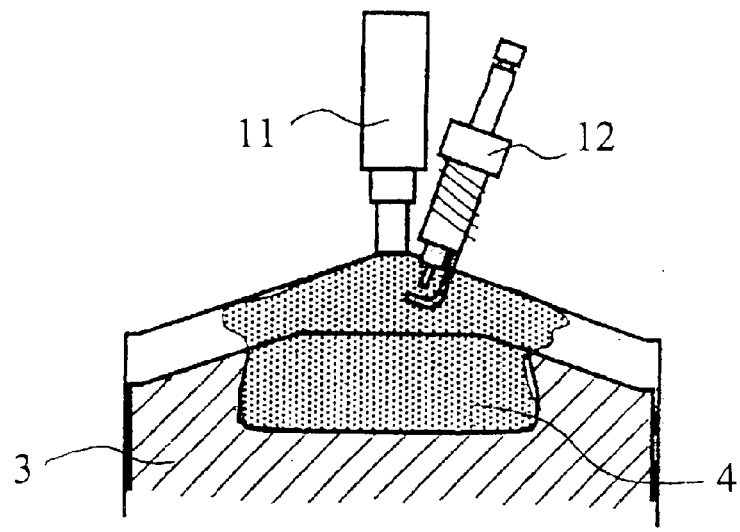
FIG. 7(a) is a diagrammatic cross sectional view of the combustion chamber shown in FIG. 1 illustrating distribution of the air-fuel mixture in the combustion chamber in a high-load stratified combustion region when an engine load is relatively high in accordance with the second embodiment of the present invention.
Figure 7B:
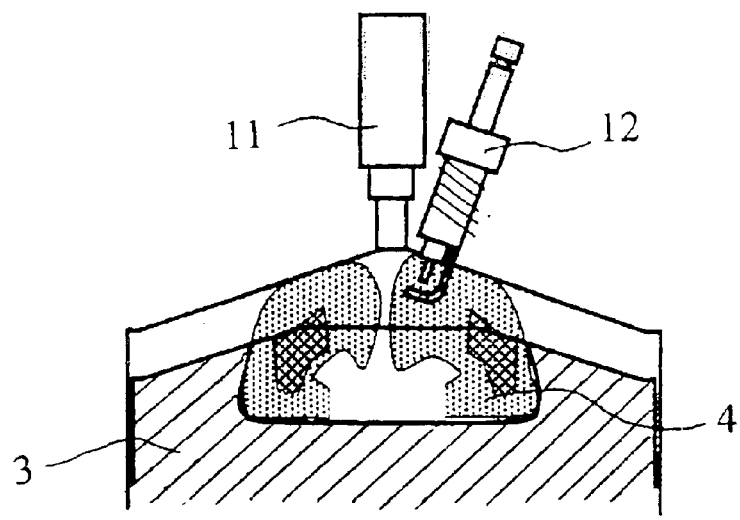
FIG. 7(b) is a diagrammatic cross sectional view of the combustion chamber shown in FIG. 1 illustrating distribution of the air-fuel mixture in the combustion chamber in a high-load stratified combustion region when an engine load is relatively low in accordance with the second embodiment of the present invention.

Moreover, the control unit 13 is configured and arranged to change operation parameters including the intake valve closing timing, the fuel injection pressure, the fuel injection timing and the fuel ignition timing depending on whether the direct fuel injection engine is operating in the high-load or low-load stratified combustion regions. As seen in FIG. 7(*a*), when the direct fuel injection engine is operating in the high-load stratified combustion region and when the engine load is relatively high within the high-load stratified region, a relatively dense homogeneous air-fuel mixture is formed in the space above the cavity 4. However, as the engine load becomes smaller in the high-load stratified combustion region, the density of the air-fuel mixture formed in the space above the cavity 4 becomes thinner as shown in FIG. 7(*b*). Thus, the second embodiment of the present invention is configured to control the fuel injection timing and the fuel ignition timing of the direct fuel injection engine to keep the density of the air-fuel mixture formed inside the combustion chamber within an air-fuel ratio which is combustible and which does not worsen the exhaust gas emissions. In other words, under the conditions where the engine load is so high that the density of the homogeneous air-fuel mixture formed in the space above ihe cavity 4 becomes very dense which results in worsening the exhaust emission, the fuel injection timing and fuel ignition timing is controlled so that a part of the air-fuel mixture is drawn to the outside of the cavity 4. Under the conditions where the density of the homogeneous air-fuel mixture formed in the space above the cavity 4 becomes so lean that there is a danger that an accidental combustion may occur, the fuel injection timing and ignition timing is controlled such that an air-fuel mixture with a mild air-fuel ratio distribution is ignited before the air-fuel mixture spreads throughout the entire space above the cavity 4.

Figure 8:
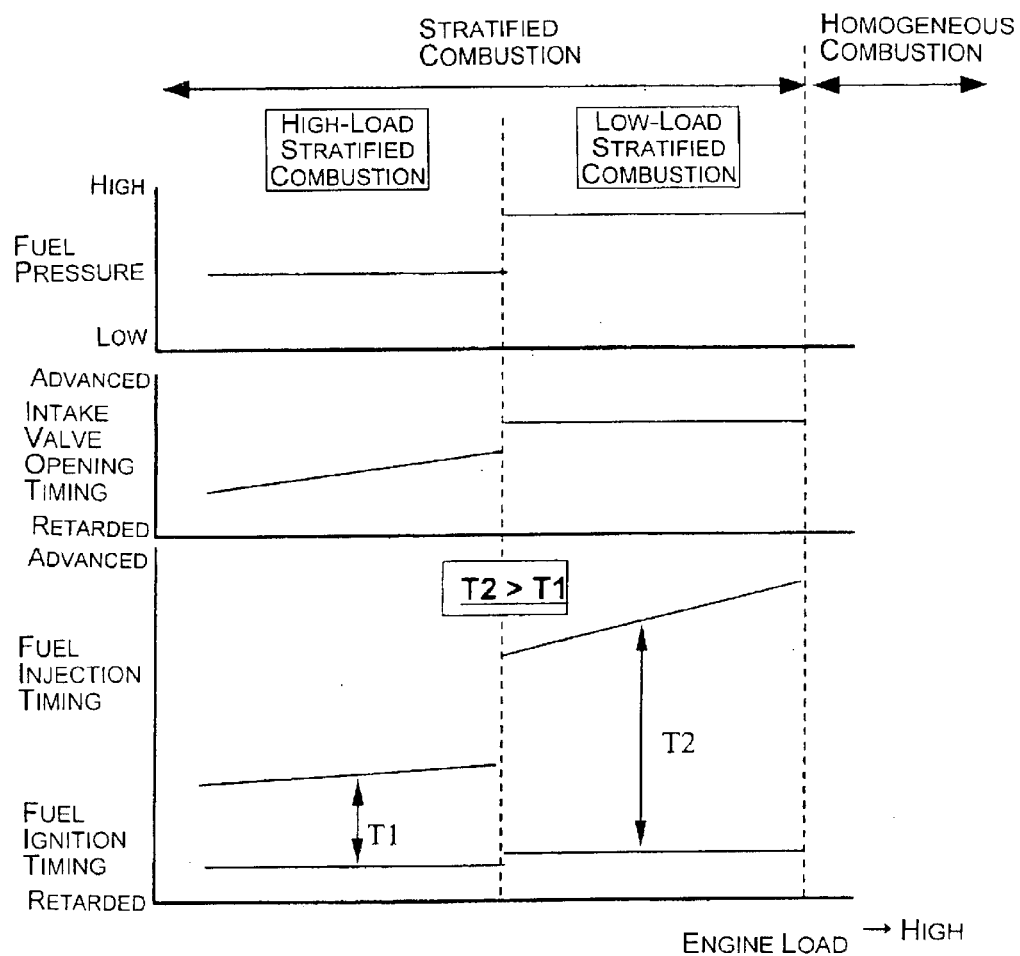
FIG. 8 is a diagrammatic chart illustrating a change in control parameters including fuel pressure, intake valve closing timing, fuel injection timing, and fuel ignition timing between the high-load and low-load stratified combustion regions with respect to the engine load in accordance with the second embodiment of the present invention.
Figure 9:
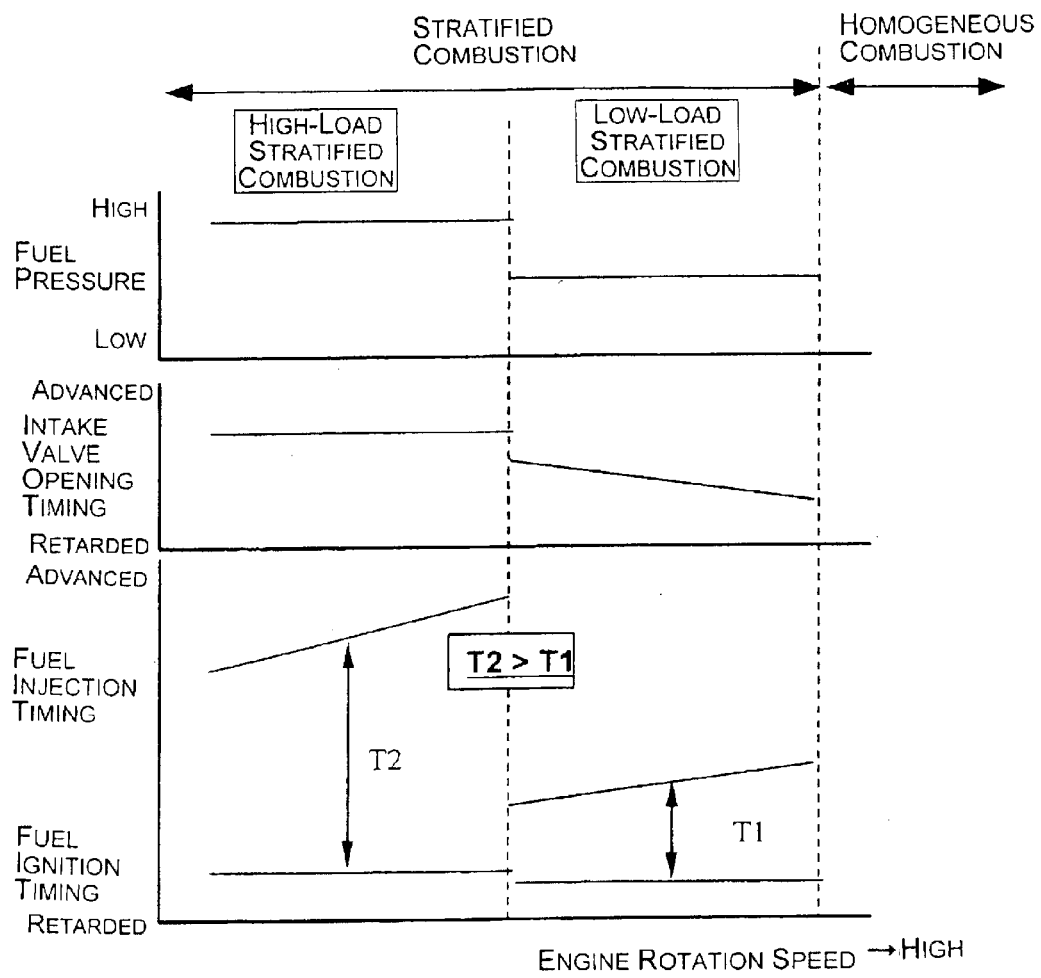
FIG. 9 is a diagrammatic chart illustrating a change in control parameters including fuel pressure, intake valve closing timing, fuel injection timing, and fuel ignition timing between the high-load and low-load stratified combustion regions with respect to the engine rotation speed in accordance with the second embodiment of the present invention.

More specifically, FIG. 8 illustrates variations in each parameter with respect to the engine load assuming the engine rotation speed is constant. FIG. 9 illustrates variations in each parameter with respect to the engine rotation speed assuming the engine load is constant. As shown in FIGS. 8 and 9, the fuel injection timing in the low-load stratified combustion region is set to be more retarded with respect to the fuel injection timing in the high-load stratified combustion region. Moreover, in both the low-load and high-load stratified combustion regions, the fuel injection timing is controlled such that the fuel injection timings is more advanced as the engine load becomes higher or the engine rotation speed becomes faster.

Moreover, the fuel ignition timing in the low-load stratified combustion region is also set more retarded with respect to the fuel injection timing in the high-load stratified region. However, an amount of change in fuel ignition timing between the low-load and high-load stratified combustion regions is kept smaller than an amount of change in fuel injection timing between the low-load and high-load stratified combustion regions. In other words, as seen in FIGS. 8 and 9, intervals T1 and T2 between the fuel injection timing and the fuel ignition timing in low-load and high-load stratified combustion regions, respectively, are preferably set such that the interval T1 of the low-load stratified combustion region is shorter than the interval T2 of the high-load stratified combustion region. This arrangement of the control parameters provides reliable ignition of the fuel stream that is floating in the combustion chamber 1 before the fuel stream collides against the piston 3 in the low-load stratified combustion region.

In FIGS. 8 and 9, the fuel ignition timing is simplified to be substantially constant within the high-load or low-load stratified combustion region. However, it will be obvious to one of ordinary skill in the art from this disclosure that the fuel ignition timing can be varied in each stratified combustion region as the fuel ignition timing is preset to realize optimum fuel efficiency and exhaust emission as explained above.

Moreover, the intake valve closing timing in the low-load stratified combustion region is more retarded with respect to the intake valve closing timing in the high-load stratified combustion region. Accordingly, the pressure inside the cylinder during the fuel injection timing is lowered in the low-load stratified combustion region. Thus, the actual fuel stream angle (injection opening angle) of the fuel stream in the low-load stratified combustion region expands slightly due to the pressure differential between the high-load and low-load combustion regions. Thus, the fuel stream is further reliably directed in the vicinity of the spark plug 12 to achieve stable combustion.

Furthermore, the fuel injection pressure (fuel pressure) in the low-load stratified combustion region is set lower than the fuel injection pressure in the high-load stratified combustion region. Thus, the travel speed of the fuel stream in the low-load stratified combustion region is reduced such that the air-fuel mixture formed around the fuel stream main axis remains in the vicinity of the spark plug 12. Thus, even more reliable and stable combustion can be achieved in the low-load stratified combustion region.

According to the second embodiment of the present invention, the operation of the direct fuel injection engine is switched between the low-load stratified combustion region and the high-load stratified combustion region depending on the engine load and engine rotation speed to provide sufficient time required to form the air-fuel mixture, and thus, stable stratified combustion is obtained regardless of the engine rotation speed.

Since the air-fuel mixture is formed and ignited after the fuel stream hits against the cavity 4 and guided upwardly above the cavity 4 in the high-load stratified combustion region, the fuel is sufficiently vaporized and mixed with the air to form a relatively homogeneous air-fuel mixture in the space above of the cavity 4. Thus, smoke or CO discharge from an excessively dense air-fuel mixture can be reduced and the engine operation is prevented from being affected by the fluctuations in the cycle of the air-fuel mixture distribution.

However, when the engine rotation speed increases in the high-load stratified combustion region, there is a concern that the time may be insufficient to form a homogeneous air-fuel mixture. Moreover, there is also a danger of the flow inside the cylinder becoming too strong that the air-fuel mixture is excessively diffused and the area near the spark plug 12 becomes excessively thin.

Thus, the second embodiment of the present invention is configured to execute the operation in the low-load stratified combustion region when the engine rotation speed is relatively fast. In the low-load stratified combustion region, the fuel stream floating in the air forms the air-fuel mixture from the peripheral areas of the fuel stream by mixing with the air and vaporizing the fuel directly after the fuel is injected. Thus, the fuel stream without going through the cavity 4 is quickly formed into a compact air-fuel mixture directly below the fuel injection valve 11 near the spark plug 12. Therefore, in the second embodiment of the present invention, stable stratified combustion can be obtained regardless of the engine rotation speed.

Moreover, the first prescribed engine load and the first prescribed engine rotation speed are set such that the first prescribed engine load becomes larger as the first prescribed engine rotation speed becomes faster. When the engine load is higher, the amount of fuel injected is larger, which sometimes results in forming an excessively dense air-fuel mixture. Thus, by setting the first prescribed rotation speed such that the first prescribed rotation speed gets faster as the first prescribed engine load becomes larger, when the engine load is high, the operation of the low-load stratified combustion region is executed only when the engine rotation speed is relatively fast. Thus, a danger of smoke discharge is reduced. Moreover, when the engine load is relatively high and the engine rotational speed is relatively slow in the stratified combustion operating region, the operation in the high-load stratified combustion region is executed. Since the fuel injection amount is relatively large when the engine load is relatively high, the mixing of the air and fuel is promoted by the gas flow inside the cylinder to prevent forming a less dense air-fuel mixture in the vicinity of the spark plug 12 in the high-load stratified combustion region in which the air-fuel mixture is formed after the fuel stream collides against the cavity 4.

However, because the total fuel injection amount increases when the engine load is larger than the second prescribed engine load, sufficient mixing of the fuel and air is difficult even though the flow is intensified by faster engine rotation speed in the low-load stratified combustion region, which increases the danger that an excessively dense air-fuel mixture will be partially formed. Thus, in the second embodiment of the present invention, the control unit 13 is configured to determine the direct fuel injection engine is operating in the high-load stratified combustion region when the engine load is higher than the second prescribed engine load. Accordingly, when the fuel injection amount exceeds certain amount due to increase in the engine load, smoke discharge can be controlled and good combustion obtained by executing the operation in the high-load stratified combustion engine in which the fuel stream is sufficiently vaporized and mixed with the air as the air-fuel mixture is formed after the fuel stream collides against the cavity 4 and guided upwardly above the cavity 4.

Furthermore, when the engine load is equal to or less than the third prescribed engine load, the fuel injection amount is small. Therefore, there is the danger of the density of the air-fuel mixture becoming excessively thin when attempting to ignite the fuel after the air-fuel mixture is formed via the cavity 4 in the high-load stratified combustion region. Accordingly, the control unit 13 is configured to determine the direct fuel injection engine is operating in the low-load stratified combustion region when the engine load is lower than the third prescribed engine load. Thus, the air-fuel mixture formed directly after the fuel is injected is ignited thereby making it possible to prevent the combustion stability from worsening when the engine load is low.

As described above, when the engine rotation speed becomes faster, there is the danger that there is no sufficient time to form an air-fuel mixture formed via the cavity 4. Even when the engine rotation speed is relatively high and engine load is relatively high, the stratified combustion can be obtained by igniting an air-fuel mixture formed via the cavity 4 although the air-fuel mixture may contain relatively dense air-fuel ratio due to the large amount of the fuel injection. However, when the engine rotation speed is fast with respect to time required to form an air-fuel mixture using the cavity 4 (which is usually determined based on the fuel injection pressure, the shape of the cavity, and the like), there may not be sufficient time to form an air-fuel mixture in the vicinity of the spark plug 12 via cavity 4. Thus, the control unit 13 is configured to determine the direct fuel injection engine is operating in the low-load stratified combustion region when the engine rotation speed is higher than the second prescribed engine rotation speed. Accordingly, the combustible air-fuel mixture is positioned near the spark plug 12 even when the engine rotation speed is fast.

Moreover, according to the second embodiment of the present invention, the control unit 13 is configured to change at least one of the fuel injection timing, fuel ignition timing, intake valve closing timing and fuel injection pressure in conjunction with switching operations among the low-load stratified combustion region and the high-load stratified combustion region. Since these parameters can be instantly controlled without using special equipments, suitable operation of the direct fuel injection engine is obtained without increasing the cost. Thus, even when a driver of the vehicle suddenly changes the operating state of the vehicle, the operations among the high-load and low-load stratified combustion regions are switched without degrading the driving performance of the vehicle.

In order to achieve good fuel efficiency and less exhaust emission regardless of the operating state of the direct fuel injection engine, a heat generation time after fuel ignition must be optimized. In other words, the fuel ignition timing must be set such that an optimum heat generation time is obtained for each operating state. However, the fuel ignition timing is required to be in a certain range of time span in a cycle and cannot exceed this range. Thus, in order to accommodate this situation, the fuel injection timing is varied to optimize the heat generation time in the second embodiment of the present invention. Since the fuel injection timing in the low-load stratified combustion region is set more retarded than the fuel injection timing in the high-load stratified combustion region, the fuel stream is allowed to pass through the cavity 4 and sufficiently mixed after the fuel is injected in the high-load stratified combustion region, and the fuel stream forms an air-fuel mixture that is ignited directly after the fuel is injected in the low-load stratified combustion region.

In addition, in the low-load stratified combustion region, the travel direction of the fuel stream must approach the spark plug 12 in order to reliably position the air-fuel mixture in the vicinity of the spark plug 12. If the travel direction of the fuel stream is preset to direct at the spark plug 12, there is a concern that smoldering may occur on the spark plug 12 especially when the engine load is high. Accordingly, in the present invention, the intake valve closing timing in the low-load stratified combustion region is set to more retarded relative to the intake valve closing timing in the high-load stratified combustion region so that the pressure inside the cylinder during the fuel injection is reduced in the low-load stratified combustion region. Thus, the actual fuel stream injection angle (injection opening angle) is slightly increased to reliably position the combustible air-fuel mixture close to the spark plug 12 in the low-load stratified combustion region. Moreover, in the high-load stratified combustion region, by closing the intake valve early, the pressure inside the cylinder is increased and the actual fuel stream injection angle is slightly reduced. Thus, the fuel stream is further reliably directed toward the cavity 4 to form the air-fuel mixture inside and above the cavity 4.

According to the second embodiment of the present invention, the fuel injection pressure in the low-load stratified combustion region is set lower than the fuel injection pressure in the high-load stratified combustion region. Thus, the penetrative force of the fuel stream is reduced in the low-load stratified combustion region and the fuel undergoes even more vaporization because the fuel is floating. Moreover, the air-fuel mixture distribution is further made compact and further reliable ignition is obtained.

Furthermore, in the second embodiment of the present invention, the interval T1 between the fuel injection timing and ignition timing in the low-load stratified combustion region is set shorter than the interval T2 between the fuel injection timing and ignition timing in the high-load stratified combustion region. Accordingly, the fuel stream is further reliably ignited while the fuel is floating and a compact air-fuel stream formation is achieved to prevent the exhaust emissions from worsening.

THIRD EMBODIMENT

Figure 10:
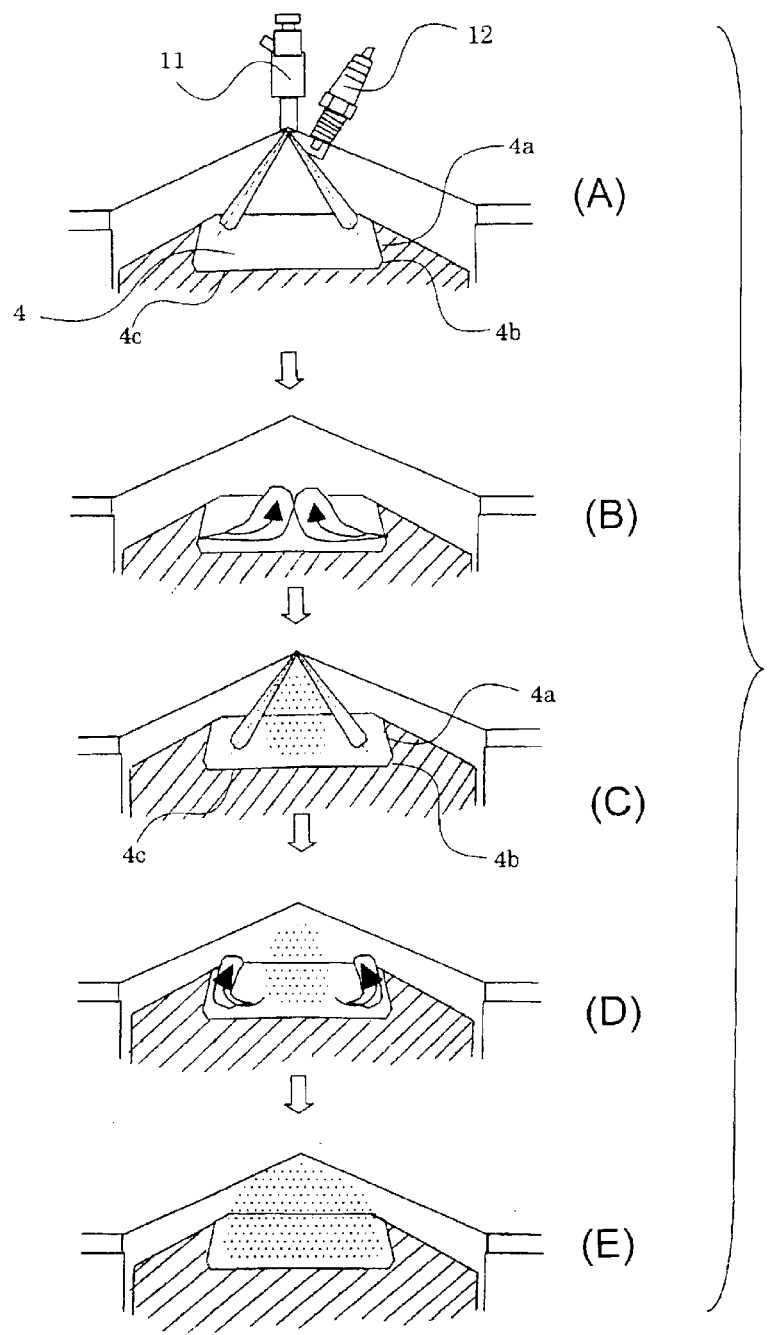
FIG. 10 is a diagrammatic cross sectional view of a combustion chamber illustrating distribution of the air-fuel mixture in the combustion chamber in accordance with a third embodiment of the present invention.
Figure 11:
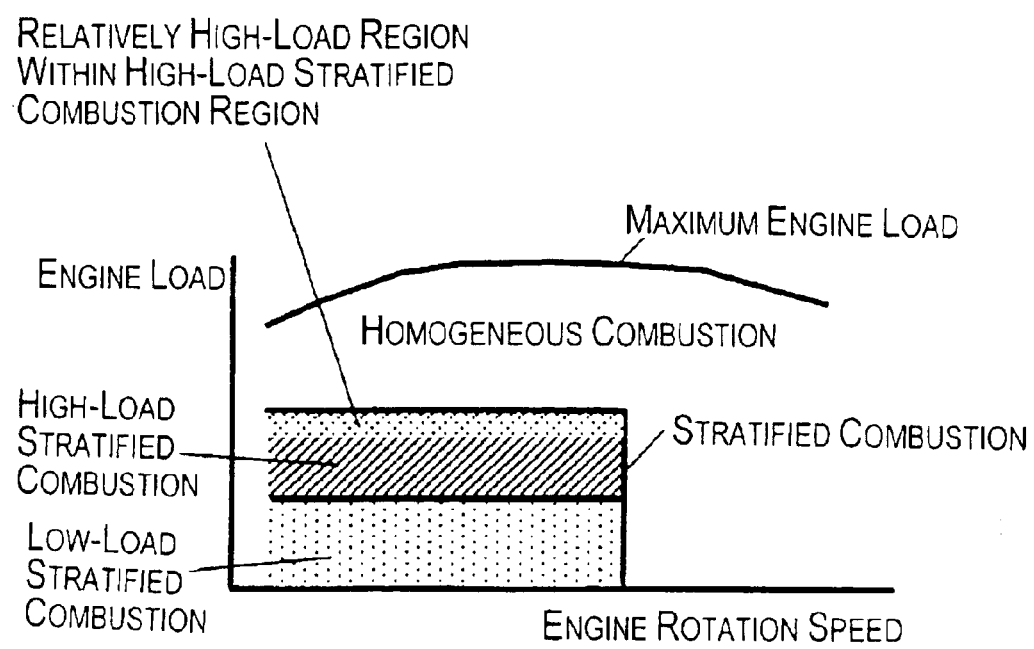
FIG. 11 is a diagrammatic chart illustrating the relationship between engine operation regions and an engine load and an engine rotation speed in accordance with the third embodiment of the present invention.

Referring now to FIGS. 10 and 11, a direct fuel injection engine in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Basically, the third embodiment is identical to the first embodiment, except that an additional fuel stream is injected during the compression stroke when the direct fuel injection engine is operating in a relatively high-load region within the high-load stratified combustion region. The additional fuel stream is injected such that the additional fuel stream first hits the bottom surface 4c of the cavity 4 and guided upwardly by the curved surface 4b and the peripheral surface 4a.

When the fuel injection pressure is not controlled to be set higher as the engine load becomes higher when the direct fuel injection engine is operating in the high-load stratified combustion region, it becomes difficult to have majority of the fuel stream collide against the cavity inner peripheral surface 4a because the duration of the fuel injection becomes longer as the engine load becomes higher. In such case, the fuel stream injected during the second half of the duration of the fuel injection would collide against the curved surface 4b of the cavity 4. The collision angle formed between the fuel stream and the curved surface 4b is substantially a right angle and the fuel stream collided against the curved surface 4b would not travel in a specific direction. Thus, the movement of the fuel stream is not converted to a circulation flow.

Accordingly, in the third embodiment of the present invention, when it is determined that the majority of the fuel stream would not collide against the cavity inner peripheral surface 4a based on the engine load, the injection of the fuel stream is divided into two injections as seen in FIG. 10. The first injection causes the fuel stream to collide against the cavity inner peripheral surface 4a creating a circulation flow in the same manner as the first embodiment as seen in diagram (B) of FIG. 10. The second injection causes the fuel stream to collide against the cavity bottom surface 4c as seen in diagram (C) of FIG. 10. This second injection creates a circulation flow in the opposite direction to the first circulation flow as seen in diagram (D) of FIG. 10. Therefore, the first half of the fuel injection creates an air-fuel mixture in the vicinity of the center of the cavity 4 and thereabove, while the second half of the fuel injection creates an air-fuel mixture in the vicinity of the inner peripheral surface 4a of the cavity 4 and thereabove. As an overall result, one large air-fuel mixture mass is created within the cavity 4 and thereabove. Since the two gas flows in directions opposite from each other are created, mixing of fuel and air is promoted resulting in excellent stratified combustible air-fuel mixture layer. Although two fuel streams are injected in the third embodiment of the present invention, it will be apparent to those skilled in the art from this disclosure to inject more than two fuel streams in a compression stroke in order to create an air-fuel mixture optimum for combustion.

FIG. 11 illustrates the relationship between the operating regions with respect to the engine load and engine rotation speed in accordance with the third embodiment. As seen in FIG. 11, the relatively high-load region within the high-load stratified combustion is a region in which it is determined the it is difficult to allow the majority of the fuel stream to collide against the cavity inner peripheral surface 4a. Thus, the relatively high-load region within the high-load stratified combustion is regarded as a multiple fuel injection region.

According to the third embodiment of the present invention, even when the fuel injection pressure is not controlled to increase in response to the engine load increases in the high-load stratified combustion region, a large air-fuel mixture mass can be created within the cavity 4 and thereabove by injecting the fuel multiple times during the compression stroke. Moreover, since the circulation flows can be created in different directions by injecting the fuel multiple times, a disturbance occurs within the cavity 4 making it possible to promote mixing between the injected fuel and air. Accordingly, stable combustion can be obtained while introducing large quantities of EGR as well as combustion with good fuel efficiency and a small amount of NOx can be obtained.

It will be apparent to those skilled in the art from this disclosure that the multiple injections of the third embodiment can be adapted to the direct fuel injection engine of the second embodiment explained above. For example, the direct fuel injection engine of the second embodiment can be configured and arranged to execute multiple fuel injections in the region where the engine load is higher than the second prescribed engine load so that a large air-fuel mixture mass can be created within the cavity 4 to obtain an excellent combustion in the relatively high-load region within the high-load stratified combustion region.

FOURTH EMBODIMENT

Figure 12:
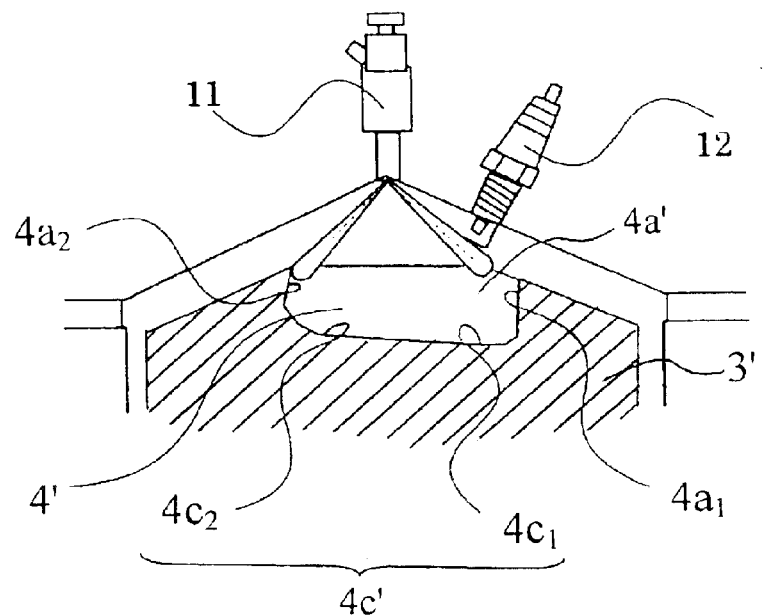
FIG. 12 is a partial cross sectional view of an injection portion of a combustion chamber of a direct fuel injection engine in accordance with a fourth embodiment of the present invention.

Referring now to FIG. 12, a direct fuel injection engine in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a prime (').

Basically, the fourth embodiment of the present invention is identical to the first embodiment, except that the spark plug 12 is positioned further away from the fuel injection valve 11 and a piston 3' is substituted for the piston 3 of the first embodiment. The piston 3' of the third embodiment is basically identical to the piton 3 of the first embodiment, except that the shape of the cavity 4' has been modified from the cavity 4 of the first embodiment.

When the spark plug 12 cannot be arranged close to the fuel injection valve 11 due to limitations on the construction of the cylinder head 2, the spark plug 12 is installed at a position away from the fuel injection valve 11 as seen in FIG. 12. In the fourth embodiment of the present invention, a bottom surface $4c_1$ of the cavity 4' is inclined such that a part of the bottom surface 4c' including a bottom surface $4c_2$ that is farther from the spark plug 12 is shallower than a part of the bottom surface 4c' including a bottom surface $4c_1$ that is closer to the spark plug 12. Moreover, the cavity 4' includes an inner peripheral surface 4a' in which a surface $4a_2$ that is farther from the spark plug 12 is less inclined toward the center axis of the piston 3' than a surface $4a_1$ that is closer to the spark plug 12. The surfaces $4a_1$ and $4a_2$ are smoothly joined in circumferential direction of the cavity 4' to form a smooth surface of the inner peripheral surface 4a'. Thus, a stratified air-fuel mixture layer suitable for combustion is formed in the vicinity of the spark plug 12 by injecting the fuel stream onto the cavity inner peripheral surface 4a' when the direct fuel injection engine is operating in a high-load stratified state.

Accordingly, in the second embodiment, even when the spark plug 12 cannot be arranged close to the fuel injection valve 11 as in the first embodiment, stable combustion can be obtained while introducing large quantities of EGR when the direct fuel injection engine is operating in the high-load stratified combustion region as in the first embodiment. Moreover, combustion with good fuel efficiency and a small amount of NOx can be also obtained.

It will be apparent to those skilled in the art from this disclosure that the structure of the spark plug 12 and the cavity 4' of the fourth embodiment can be adapted to the direct fuel injection engine of the second or third embodiment as explained above in case the spark plug 12 cannot be arranged close to the fuel injection valve 11.

FIFTH EMBODIMENT

Figure 13:
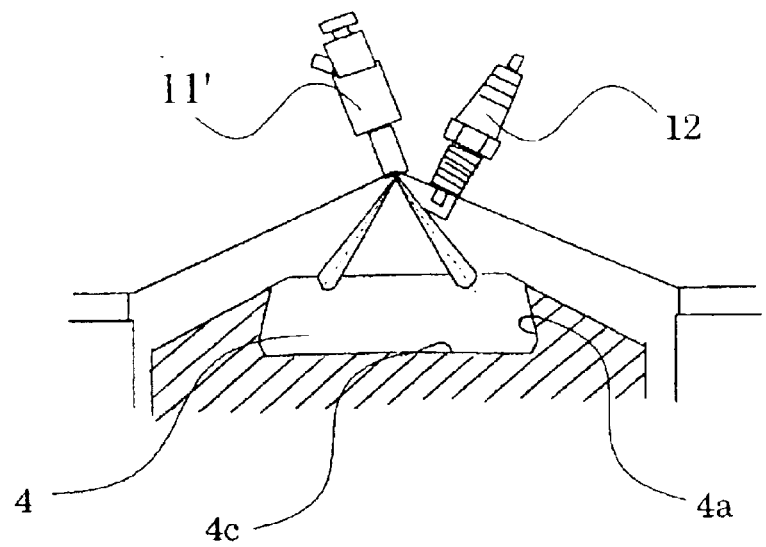
FIG. 13 is a partial cross sectional view of an injection portion of a combustion chamber of a direct fuel injection engine in accordance with a fifth embodiment of the present invention.

Referring now to FIG. 13, a direct fuel injection engine in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a prime (').

Basically, the direct fuel injection engine of the fifth embodiment is identical to the first embodiment, except that a fuel injection valve 11' is substituted for the fuel injection valve 11 of the first embodiment. More specifically, the direct fuel injection engine of the fifth embodiment utilizes the fuel injection valve 1' in cases when the fuel injection valve 11 of the first embodiment cannot be set substantially parallel to the center axis of the piston 3. The injection valve 11' is a multi-hole injection valve that allows nonsymmetrical fuel injection in the axial direction of the fuel injection valve 11'. Thus, in the fifth embodiment, the fuel injection valve 11' is installed such that the center axis of the fuel injection valve 11' is inclined with respect to the center axis of the piston 3 and the fuel stream injected from the fuel injection valve 11' forms a hollow cone shape that is substantially symmetrical with respect to the center axis of the piston 3, as seen in FIG. 13.

Accordingly, in the fifth embodiment, even when the fuel injection valve 11 cannot be set substantially parallel to the center axis of the piston 3, the shape of fuel stream is formed into a hollow cone that is substantially symmetrical with respect to the piston 3. Consequently, unburned HC as well as cooling loss can be reduced when the engine is operating in the low-load stratified state as in the first embodiment. Also, combustion with good fuel efficiency and a small amount of exhaust gas emissions can be obtained. When the engine is operating in the high-load stratified state, stable combustion is obtained while introducing large quantities of EGR as well as combustion with good fuel efficiency and a small amount of NOx.

It will be apparent to those skilled in the art from this disclosure that the structure of the fuel injection valve 11' of the fifth embodiment can be adapted to the direct fuel injection engine of the second or third embodiment as explained above in case the fuel injection valve 11 cannot be arranged substantially parallel to the center axis of the piston 3.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

The application claims priority to Japanese Patent Application Nos. 2003-121610 and 2003-154056. The entire disclosures of Japanese Patent Application Nos. 2003-121610 and 2003-154056 are hereby incorporated herein by reference.

While onely selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection engine comprising:
   a combustion chamber;
   a piston including a top surface having a cavity at a substantially center portion of the top surface, the cavity being defined at least by a peripheral wall surface and a bottom surface;
   a fuel injection valve positioned at an upper portion of the combustion chamber substantially on a center axis of the piston, the fuel injection valve being configured and arranged to directly inject a fuel stream inside the combustion chamber in a substantially constant hollow circular cone shape during a compression stroke when the direct fuel injection engine is operating in a stratified combustion region;
   a spark plug configured and arranged to ignite the fuel; and
   a control unit configured and arranged to control operations of the fuel injection valve and the spark plug, the control unit being further configured and arranged to ignite a first air-fuel mixture formed directly after the fuel stream is injected from the fuel injection valve and prior to a majority of the fuel stream striking the cavity when the direct fuel injection engine is operating in a low-load stratified combustion region, the control unit being further configured and arranged to ignite a second air-fuel mixture formed after a majority of the fuel stream is guided toward an upper portion of the combustion chamber above the cavity by the bottom surface of the cavity after the fuel stream first hits the peripheral wall surface of the cavity when the direct fuel injection engine is operating in a high-load stratified combustion region.

2. The direct fuel injection engine as recited in claim 1, wherein
   the control unit being further configured and arranged to ignite the first-air fuel mixture prior to a tip of the fuel stream hits the top surface of the piston.

3. The direct fuel injection engine as recited in claim 1, wherein
   the fuel injection valve includes a plurality of nozzles to inject a plurality of solid-core fuel streams that collectively form the fuel stream having the substantially constant hollow circular cone shape.

4. The direct fuel injection engine as recited in claim 1, wherein
   the peripheral wall surface of the cavity is slanted radially inwardly toward the center axis of the piston such that the cavity forms substantially a partial cone shape.

5. The direct fuel injection engine as recited in claim 1, wherein
   the bottom surface of the cavity is a substantially flat surface.

6. The direct fuel injection engine as recited in claim 1, wherein
   the control unit is further configured and arranged to set a start timing of a fuel injection in the high-load stratified combustion region more advanced than a start timing of a fuel injection in the low-load stratified combustion region.

7. The direct fuel injection engine as recited in claim 1, wherein
   the control unit is further configured and arranged to set a fuel injection pressure in the high-load stratified combustion region that is stronger than a fuel injection pressure in the low-load stratified combustion region.

8. The direct fuel injection engine as recited in claim 1, wherein
the control unit is further configured and arranged to inject at least one additional fuel stream during the compression stroke when the direct fuel injection engine is operating in a relatively high-load region within the high-load stratified combustion region, the additional fuel stream being injected such that the additional fuel stream first hits the bottom surface of the cavity.

9. The direct fuel injection engine as recited in claim 1, wherein
the control unit is further configured and arranged to inject the fuel stream during an intake stroke when the direct fuel injection engine is operating in a homogeneous combustion region in which a load is higher than a load in the high-load stratified combustion region.

10. The direct fuel injection engine as recited in claim 1 wherein
the control unit is configured and arranged to determine the direct fuel injection engine is operating in the low-load stratified combustion region when an engine load is lower than a first prescribed engine load and an engine rotation speed is higher than a first prescribed engine rotation speed, and
the control unit is configured and arranged to determine the direct fuel injection engine is operating in the high-load stratified combustion region when an engine load is higher than the first prescribed engine load and an engine rotation speed is lower than the first prescribed engine rotation speed.

11. The direct fuel injection engine as recited in claim 10, wherein
the control unit is configured and arranged to vary the first prescribed engine load and the first prescribed engine rotation speed such that as the first prescribed engine load is increased the first prescribed engine rotation speed is increased.

12. The direct fuel injection engine as recited in claim 10, wherein
the control unit is further configured and arranged to determine the direct fuel injection engine is operating in the high-load stratified combustion region when the engine load is higher than a second prescribed engine load which is higher than the first prescribed engine load regardless of the engine rotation speed.

13. The direct fuel injection engine as recited in claim 10, wherein
the control unit is further configured and arranged to determine the direct fuel injection engine is operating in the low-load stratified combustion region when the engine load is lower than a third prescribed engine load which is lower than the first prescribed engine load regardless of the engine rotation speed.

14. The direct fuel injection engine as recited in claim 10, wherein
the control unit is further configured and arranged to determine the direct fuel injection engine is operating in the low-load stratified combustion region when the engine rotation speed is higher than a second prescribed engine rotation speed which is higher than the first prescribed engine rotation speed regardless of the engine load.

15. The direct fuel injection engine as recited in claim 10, wherein
the control unit is further configured to change at least one of fuel injection timing, fuel ignition timing, intake valve closing timing and fuel injection pressure when the control unit determines the direct fuel injection engine is transferring between the low-load and high-load stratified combustion regions.

16. The direct fuel injection engine as recited in claim 15, wherein
the control unit is further configured and arranged to set the fuel injection timing such that the fuel injection timing in the low-load stratified combustion region is more retarded than the fuel injection timing in the high-load stratified combustion region.

17. The direct fuel injection engine as recited in claim 15, wherein
the control unit is further configured and arranged to set the intake valve closing timing such that the intake valve closing timing in the low-load stratified combustion region is more retarded than the intake valve closing timing in the high-load stratified combustion region.

18. The direct fuel injection engine as recited in claim 15, wherein
the control unit is further configured and arranged to set the fuel injection pressure such that fuel injection pressure in the low-load stratified combustion region is lower than the fuel injection pressure in the high-load stratified combustion region.

19. The direct fuel injection engine as recited in claims 15, wherein
the control unit is further configured and arranged to set an interval between the fuel injection timing and the fuel ignition timing in the low-load stratified combustion region shorter than an interval between the fuel injection timing and the fuel ignition timing in the high-load stratified combustion region.

20. The direct fuel injection engine as recited in claim 1, wherein
the bottom surface of the cavity is slanted such that a portion of the bottom surface that is close to the spark plug has a depth that is deeper than a depth of a portion of the bottom surface that is further to the spark plug, and
the peripheral wall surface of the cavity is slanted radially inwardly toward the center axis of the piston such that a portion of the peripheral wall surface that is close to the spark plug is less slanted toward the center axis of the piston than a portion of the peripheral surface that is further to the spark plug.

21. The direct fuel injection engine as recited in claim 1, wherein
the fuel injection valve has a center axis that is slanted with respect to the center axis of the piston, and the fuel injection valve is configured and arranged to inject the substantially constant hollow circular cone shape substantially symmetrical about the center axis of the piston.

22. A direct fuel injection engine comprising:
means for forming a combustion chamber;
fuel injection means for directly injecting a fuel stream with a substantially constant hollow circular cone shape during a compression stroke when the direct fuel injection engine is operating in a stratified combustion region,
fuel stream guiding means for guiding the fuel stream injected from the fuel injection means toward an upper portion of the combustion chamber;

ignition means for igniting first and second fuel mixture formed in the combustion chamber; and control means for controlling operations of the fuel injection means and the ignition means to ignite the first air-fuel mixture formed directly after the fuel stream is injected from the fuel injection means and prior to a majority of the fuel stream striking the fuel stream guiding means when the direct fuel injection engine is operating in a low-load stratified combustion region, and to ignite the second air-fuel mixture formed after a majority of the fuel stream is guided toward the upper portion of the combustion chamber by the fuel stream guiding means when the direct fuel injection engine is operating in a high-load stratified combustion region.

23. A method of operating a direct fuel injection engine comprising:

injecting a fuel stream into a combustion chamber with a substantially constant hollow circular cone shape during a compression stroke when the direct fuel injection engine is operating in a stratified combustion region;

selectively guiding the fuel stream toward an upper portion of the combustion chamber;

selectively igniting a first air-fuel mixture formed directly after the fuel stream is injected into the combustion chamber and prior to a majority of the fuel stream striking a piston when the direct fuel injection engine is operating in a low-load stratified combustion region;

selectively igniting a second air-fuel mixture formed after a majority of the fuel stream is guided toward the upper portion of the combustion chamber when the direct fuel injection engine is operating in a high-load stratified combustion region.

* * * * *